US010944734B2

(12) United States Patent
Orr et al.

(10) Patent No.: US 10,944,734 B2
(45) Date of Patent: Mar. 9, 2021

(54) CREATING SECURE ENCRYPTED BROADCAST/MULTICAST GROUPS OVER WIRELESS NETWORK

(71) Applicant: Cisco Technology, Inc., San Jose, CA (US)

(72) Inventors: Stephen M. Orr, Wallkill, NY (US); Aaron T. Woland, Waxhaw, NC (US); Jerome Henry, Pittsboro, NC (US)

(73) Assignee: Cisco Technology, Inc., San Jose, CA (US)

(*) Notice: Subject to any disclaimer, the term of this patent is extended or adjusted under 35 U.S.C. 154(b) by 186 days.

(21) Appl. No.: 16/104,537

(22) Filed: Aug. 17, 2018

(65) Prior Publication Data
US 2020/0059460 A1    Feb. 20, 2020

(51) Int. Cl.
| | |
|---|---|
| *H04L 29/06* | (2006.01) |
| *H04L 12/18* | (2006.01) |
| *H04W 24/08* | (2009.01) |
| *H04W 12/06* | (2021.01) |
| *H04W 12/08* | (2021.01) |

(Continued)

(52) U.S. Cl.
CPC ......... *H04L 63/065* (2013.01); *H04L 12/185* (2013.01); *H04L 12/189* (2013.01); *H04L 63/0428* (2013.01); *H04W 12/04* (2013.01); *H04W 12/06* (2013.01); *H04W 12/08* (2013.01); *H04W 24/08* (2013.01); *H04W 88/08* (2013.01)

(58) Field of Classification Search
CPC ... H04L 63/065; H04L 12/185; H04L 12/189; H04L 63/0428; H04W 12/04; H04W 12/06; H04W 12/08; H04W 24/08; H04W 88/08
See application file for complete search history.

(56) References Cited

U.S. PATENT DOCUMENTS

| | | | |
|---|---|---|---|
| 7,194,622 B1 | 3/2007 | Halasz et al. | |
| 7,519,834 B1 * | 4/2009 | Dondeti | H04L 63/065 |
| | | | 713/190 |

(Continued)

OTHER PUBLICATIONS

Geoff Huang, "Three Requirements for True Micro-Segmentation," [Accessed Online Aug. 6, 2018] https://www.techopedia.com/definition/13989/microsegmentation-collision-domains, 13 pages.

(Continued)

*Primary Examiner* — Joseph P Hirl
*Assistant Examiner* — Stephen T Gundry
(74) *Attorney, Agent, or Firm* — Patterson + Sheridan, LLP (57) ABSTRACT

Embodiments herein describe segmenting a Wi-Fi network into different groups. The embodiments herein assign a user, a client device, or a traffic flow originating from a client device to a group. For example, all the client devices for a particular user can be assigned to the same group tag, or each traffic flow in the client device may be assigned to different groups. Each group corresponds to a group key which can be transmitted to the client device when the device associates to an access point (AP). As such, within the same service set identifier (SSID), there can be multiple groups, and thus, client devices can use different group keys to communicate with other client devices associated to the same SSID. Put differently, rather than all devices connected the same SSID being assigned to the same group, the client devices can be assigned in different groups.

19 Claims, 6 Drawing Sheets

(51) Int. Cl.
*H04W 12/04* (2021.01)
*H04W 88/08* (2009.01)

(56) References Cited

U.S. PATENT DOCUMENTS

| | | | |
|---|---|---|---|
| 7,688,981 B2 | 3/2010 | Halasz et al. | |
| 7,944,925 B2 | 5/2011 | Meier et al. | |
| 9,326,144 B2* | 4/2016 | Ram | H04W 12/04031 |
| 2005/0025160 A1* | 2/2005 | Meier | H04L 12/4641 |
| | | | 370/395.53 |
| 2005/0086481 A1* | 4/2005 | Winget | H04L 63/123 |
| | | | 713/176 |
| 2006/0198368 A1* | 9/2006 | Guichard | H04L 63/0272 |
| | | | 370/389 |
| 2006/0285529 A1* | 12/2006 | Hares | H04L 45/22 |
| | | | 370/338 |
| 2007/0223701 A1 | 9/2007 | Emeott et al. | |
| 2007/0286108 A1* | 12/2007 | Meier | H04L 12/185 |
| | | | 370/312 |
| 2010/0023752 A1* | 1/2010 | Barker | H04W 12/04031 |
| | | | 713/153 |
| 2014/0233734 A1* | 8/2014 | Ram | H04L 49/354 |
| | | | 380/270 |
| 2015/0327024 A1* | 11/2015 | Yang | H04W 48/20 |
| | | | 370/312 |
| 2015/0372870 A1* | 12/2015 | Stiff | H04W 12/04 |
| | | | 370/338 |
| 2016/0105346 A1* | 4/2016 | Pignataro | H04L 43/08 |
| | | | 370/253 |
| 2016/0192187 A1* | 6/2016 | Tao | H04W 12/04 |
| | | | 380/270 |
| 2016/0198501 A1* | 7/2016 | Verkaik | H04W 8/04 |
| | | | 370/329 |
| 2016/0295413 A1* | 10/2016 | Liu | H04W 12/003 |
| 2016/0345208 A1* | 11/2016 | Gates | G06Q 10/02 |
| 2017/0230824 A1* | 8/2017 | Li | H04W 88/08 |
| 2018/0019976 A1* | 1/2018 | Ben-Shalom | H04L 12/185 |
| 2018/0288614 A1* | 10/2018 | Zaks | H04W 12/0602 |
| 2019/0028892 A1* | 1/2019 | Henry | H04L 9/3271 |
| 2019/0190729 A1* | 6/2019 | Levy-Abegnoli | H04L 45/64 |

OTHER PUBLICATIONS

Trevor Pott, "Microsegmentation Is the Future," Virtualization Review, Jun. 28, 2017, [Accessed Online Aug. 6, 2018] https://virtualizationreview.com/articles/2017/06/28/microsegmentation-is-the-future.aspx.

Techopedia, "Microsegmentation-collision-domains," 2 pages, [Accessed Online Aug. 6, 2018] https://www.techopedia.com/definition/13989/microsegmentation-collision-domains.

Derek Major, "Microsegmentation: A new security paradigm," Jun. 10, 2016, GGN, 4 pages [Accessed Online Aug. 6, 2018] https://gcn.com/articles/2016/06/10/microsegmentation.aspx.

* cited by examiner

CREATING SECURE ENCRYPTED BROADCAST/MULTICAST GROUPS OVER WIRELESS NETWORK

TECHNICAL FIELD

Embodiments presented in this disclosure generally relate to segmenting a wireless network.

BACKGROUND

Network segmentation in computer networking involves splitting a computer network into subnetworks, each being a network segment. Network segmentation can improve performance since there are fewer hosts per subnetwork, thus minimizing local traffic. Further, network segmentation can improve security because the internal network structure is not visible from the outside and there is a reduced number of available attack surfaces if one of the hosts on the network segment is compromised. On wired networks, this segmentation is often achieved with segment identifier metadata, such as group membership, VXLAN Network Identifier, Scalable Group Tag (SGT), Endpoint Group (EPG) etc. This segmentation only applies to the wired traffic. However, very few, if any, viable options exist for performing network segmentation to Wi-Fi networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method that includes identifying description data corresponding to first and second client devices, assigning the first client device to a first multicast group and the second client device to a second multicast group based on the description data, and transmitting a first group key corresponding to the first multicast group to the first client device and a second group key corresponding to the second multicast group to the second client device. The first and second group keys permit the first and second client devices to transmit encrypted multicast traffic to the first and second multicast groups, respectively, when the first and second client devices are wirelessly connected to a same service set identifier (SSID)

Another embodiment described herein is a system that includes a first AP supporting a first SSID, a controller coupled to the first AP, and a group assignor. The group assignor is configured to identify description data corresponding to first and second client devices and assign the first client device to a first multicast group and the second client device to a second multicast group based on the description data. The first AP is configured to wirelessly transmit a first group key corresponding to the first multicast group to the first client device and a second group key corresponding to the second multicast group to the second client device. Moreover, the first and second group keys permit the first and second client devices to transmit encrypted multicast traffic to the first and second multicast groups, respectively, when the first and second client devices are wirelessly connected to the first SSID.

Another embodiment described herein is non-transitory computer-readable medium having program instructions embodied therewith, the program instructions executable by a processor to perform an operation. The operation includes identifying description data corresponding to first and second client devices, assigning the first client device to a first multicast group and the second client device to a second multicast group based on the description data, and transmitting a first group key corresponding to the first multicast group to the first client device and a second group key corresponding to the second multicast group to the second client device. Moreover, the first and second group key permit the first and second client devices to transmit encrypted multicast traffic to the first and second multicast groups, respectively, when the first and second client devices are wirelessly connected to a same SSID.

Example Embodiments

Embodiments herein describe micro-segmenting a Wi-Fi network into different groups. While segmentation describes actions intended to divide network users and devices in different groups, and preventing these groups from accessing the other groups' traffic without filter, micro-segmentation extends this division and isolation further by applying the segmentation based on further user, device, or traffic characterization. For example, where segmentation would allow all users of a target group to communicate and access each other's traffic, micro-segmentation may only allow users in the group using a specific application to communicate or access each other's traffic (for that application, or in general). Thus, micro-segmentation extends the concept of segmentation beyond standard user or device grouping, and applies it using multiple criteria, at multiple layers (e.g. application types, role within the group or any other criterion or combination of criteria beyond 'device' and 'user').

Rather than using typical segmentation structures such as VLANs, the embodiments herein assign a user, a client device, or a traffic flow originating from a client device to a group. As a result, micro-segmentation can be used to limit the communication to smaller groups within a VLAN. For example, all the client devices for a particular user can be assigned to the same group, or each traffic flow in the client device may be assigned to different groups. When encryption is used, each group has a corresponding group key which can be transmitted to the client device when the device associates to an access point (AP) or when certain conditions are met. As such, within the same service set identifier (SSID), there can be multiple groups, and thus, client devices can use different group keys to communicate with other client devices associated to the same SSID. Put differently, rather than all devices connected the same SSID being assigned to the same group, and thus, having the same group key, the client devices can be assigned to different groups and have different group keys.

Advantageously, micro-segmenting the Wi-Fi network in this manner can vastly reduce the network resources needed to transmit and receive "group" traffic (e.g., multicast or broadcast traffic). For example, with large, public SSIDs, multicast traffic can overwhelm the AP and cause user devices to broadcast public information (e.g., names and other identifying information) to other client devices connected to the SSID. However, by first grouping client devices into a group and assigning a group key for that group, the multicast traffic is received only by other members in the group which limits load on the AP and reduces the unwanted dissemination of personal information to other client devices connected to the same SSID. Moreover, because group keys are assigned on the group level rather than the SSID level, client devices connected to different SSIDs but are assigned to the same group can nonetheless transmit and receive multicast data traffic since they can share the same group key (assuming the SSIDs are on the same radio).

Figure 1:
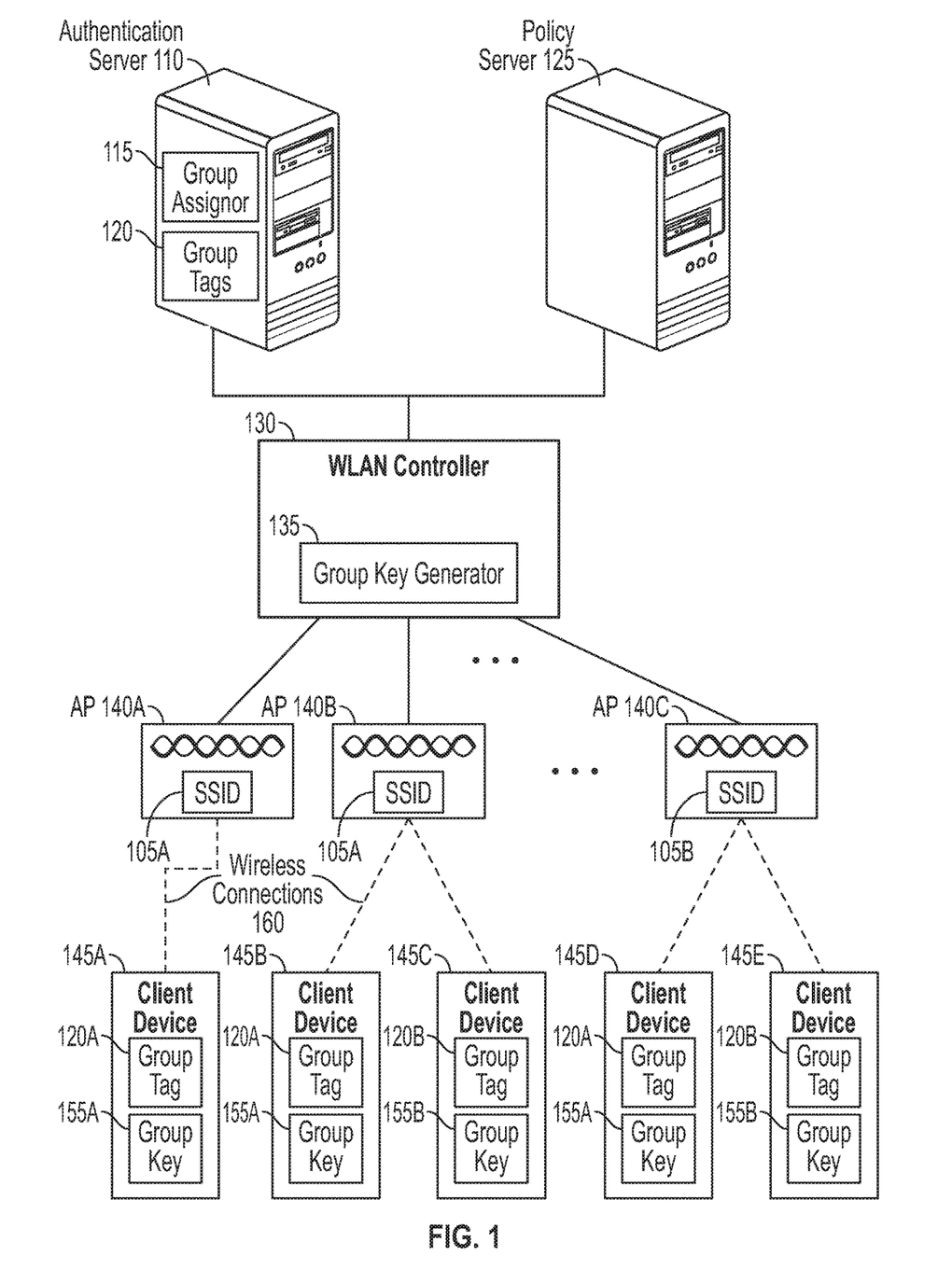
FIG. 1 illustrates a segmented Wi-Fi network, according to one embodiment described herein.

FIG. 1 illustrates a segmented Wi-Fi network 100, according to one embodiment described herein. The Wi-Fi network 100 includes an authentication server 110, a policy server 125, a wireless local access network (WLAN) controller 130, APs 140, and client devices 145. The authentication server 110 includes a group assignor 115 (e.g., a software application) which uses description data about the client devices 145 (or a user owning the client devices 145) to assign each client device 145 to a group represented by the group tags 120. For example, when a client device 145 first attempts to a connect to a SSID 105 hosted by an AP 140, the AP 140 generates or receives description data from the client device 145 such as device type, application type, user name, user attribute (e.g., the user's job title), and the like. Using the description data, the group assignor 115 selects one of the group tags 120 which represents the group assigned to the client device 145. Put differently, each group tag 120 corresponds to one of the groups. In one example, the group assignor 115 may use the user name (e.g., John Doe) to assign every client device 145 owned by John Doe (e.g., his laptop, mobile phone, desktop computer, wireless printer, etc.) the same group tag 120. In another example, each client device 145 owned by a service technician in Company A is assigned to a different group than the client devices 145 owned by accountants in Company A. In yet another example, the group assignor 115 may assign all client devices 145 executing a particular application to the same group. In one embodiment, the system administrator may set up the group tags 120 and the criteria used by the group assignor 115 when evaluating the description data to assign client devices 145 to a group.

The policy server 125 can sniff the traffic flowing to and from the client devices 145 to generate metadata regarding that traffic. In some embodiments, the group assignor 115 can use the metadata generated by the policy server 125 as description data when assigning the group tags 120 to the client devices 145. For example, as traffic passes through the policy server 125, it can assign labels to individual client devices 145 based on their traffic type. In turn, these labels can be forwarded to the group assignor 115 and used as description data to assign the client devices 145 (and the data flows/applications in the client devices 145) to a group.

In one embodiment, the policy server 125 assigns a tag to the client devices 145 (e.g., a TrustSec Tag or a SGT) which the policy server 125 then uses to enforce an access policy. The tag assigned by the policy server 125 can be used by switches, routers, and firewalls to make forwarding decisions. In one embodiment, the tag assigned by the policy server 125 may be leveraged (or re-used) by the group assignor 115 to assign a group key to the client devices 145. Put differently, the tag assigned by the policy server 125 may be the same as the group tag 120, in which case the same tag can be used to provide a group key 155 for the client devices 145 as well as enforce the access policy within the Wi-Fi and wired back-end network.

Although the authentication server 110 and the policy server 125 are shown as separate servers, in another example, they can be two applications executing on the same server. Further, the functions performed by the authentication server 110 and policy server 125 may be performed in a cloud-based compute environment or as part of a software defined network (SDN).

The WLAN controller 130 is a computing device (e.g., a server) or an application hosted on a computing device (e.g., a separate computing device or on one of the APs 140) which manages the APs 140. In this example, the WLAN controller 130 is coupled, using wires, to the authentication server 110, the policy server 125, and the APs 140. The WLAN controller 130 includes a group key generator 135 which uses the group tag 120 assigned to a client device 145 by the authentication server 110 to generate a unique group key 155 for each group tag 120. For example, if a client device 145 is the first client device assigned to a group (i.e., the first client device to be assigned the particular group tag 120), the group key generator 135 generates a unique group key 155 for the group tag 120 which the controller 130 then passes on to the AP 140 and the client device 145. However, if the group assignor 115 assigns a client device to a group that already has other client devices 145 as members, the group key generator 135 can use a database of previous calculated group keys 155 and select the appropriate group key 155 for the group tag 120 corresponding to the assigned group. As mentioned below, while the group key generator 135 is shown as being on the WLAN controller 130, in other embodiments the generator 135 may be hosted on the authentication server 110 or the policy server 125.

In FIG. 1, the dotted lines illustrate wireless connections 160 between the APs 140 and the client devices 145. As part of associating to an AP 140, the AP 140 receives a group key 155 and forwards that group key 155 to the client device 145. For example, when the client device 145 attempts to connect to an SSID 105 supported by the AP 140, the AP 140 may send a request to the authentication server 110 to determine whether the client device 145 is authorized to connect to the SSID 105. If so, the group assignor 115 and the group key generator 135 provide the group tag 120 and group key 155 to the AP 140 which forwards this information to the client device 145. Although not shown, the AP 140 and the client device may work together to determine a unicast key so that unicast traffic transmitted between the AP 140 and the client device 145 is secure. In one embodiment, once secure unicast communication is established using a unicast key, the AP 140 can securely transmit the group tag 120 and the group key 155 to the client device.

In FIG. 1, the client devices 145A, 145B, and 145D are assigned to the same group, and thus, have the same group tag 120A and group key 155A. The client devices 145C and 145E are assigned to the same group which is different from the group assigned to the client devices 145A, 145B, and 145D, and thus, have a different group tag 120B and group key 155B. Moreover, the client devices 145A, 145B, and 145C are connected to the same SSID—i.e., SSID 105A— while the client devices 145D and 145E are connected to a different SSID—i.e., SSID 105B. Nonetheless, the client devices 145 connected to the same SSID can be assigned to different groups, as is the case with client devices 145B and 145C and client devices 145D and 145E. Further, the client devices 145 can be connected to different SSIDs (and different APs 140) and be in the same group such as the case with client devices 145C and 145E which are in the same group represented by the group tag 120B but are connected to different SSIDs 105 and APs 140.

When sending multicast or broadcast data (referred to generally as multicast data or traffic), only the client devices 145 within the same group can receive the traffic. For example, the client device 145A can send a wireless multicast message which can be received only at client devices 145 which are in the same group and thus have the same group key 155A. The wireless multicast messages can be sent directly from one client device 145 to another (if in wireless range) or through the APs 140 and the WLAN controller 130 (e.g., as in the case in some implementations of the Zero Configuration Networking (Zeroconf) standard). Regardless of the manner the multicast data is transmitted, only the client devices 145 that are in the same group and have the same group key can decrypt the data. The other client devices simply ignore the data. For example, when transmitting multicast data from the client device 145A, the client device 145B can decrypt the data while the client device 145C cannot.

Further, the multicast data can extend across different SSIDs. For example, while the client devices 145A and 145B are connected to a different SSID than the client device 145D, because they are in the same group, the multicast data transmitted by one of the devices 145 can reach the other devices, although the SSIDs 105 may have to use the same channel. In this manner, a client device connected to an SSID for visitors to Company A can be assigned in the same group as a client device connected to an SSID for employees of Company A. Despite being connected to different SSIDs, the client devices can transmit and receive multicast traffic to each other. Further, although FIG. 1 illustrates each AP 140 supporting one SSID 105, the APs 140 can support multiple SSIDs 105 (e.g., multiple client devices 145 can associate to the same AP 140 but connect to different SSIDs 105 supported by that AP 140).

Figure 2:
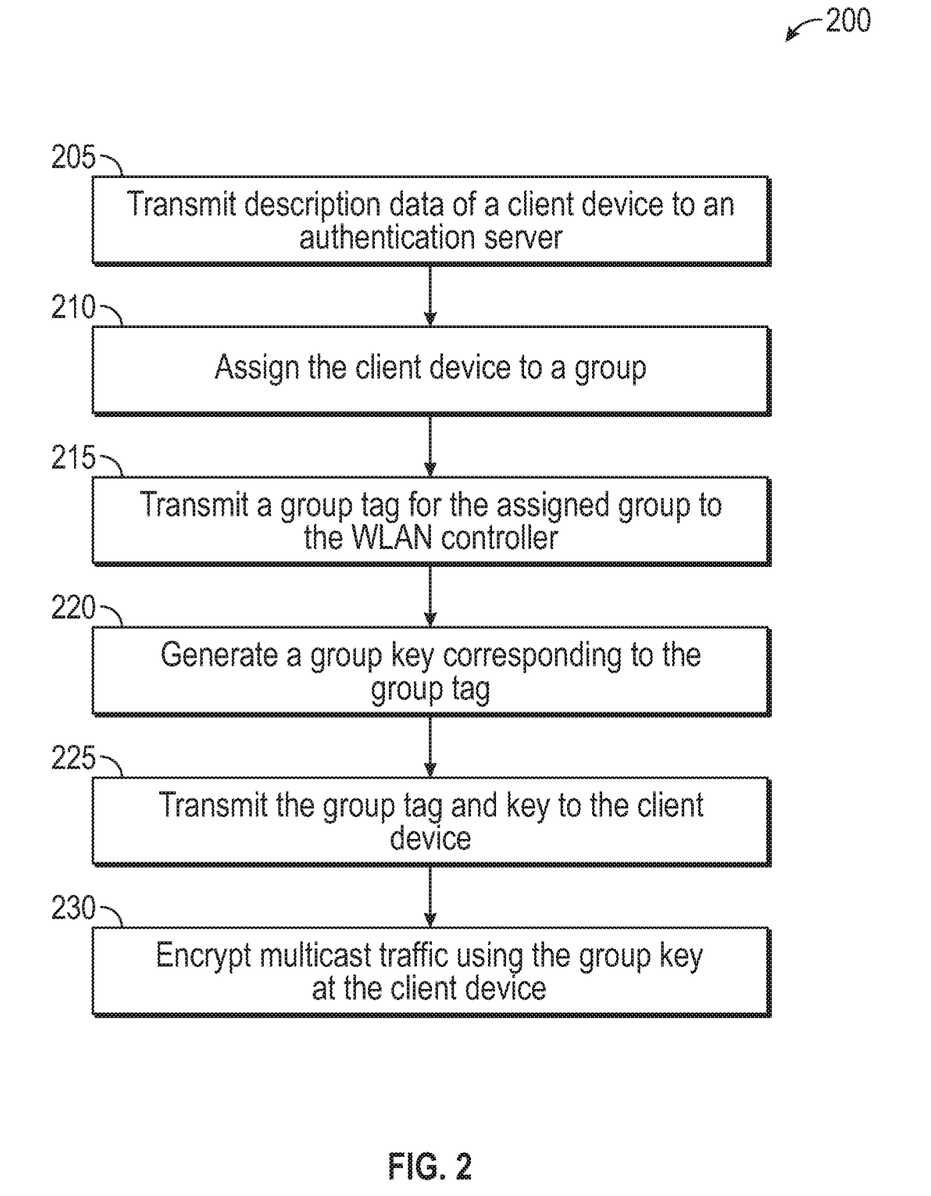
FIG. 2 is a flowchart for segmenting a Wi-Fi network using group keys, according to one embodiment described herein.

FIG. 2 is a flowchart of a method 200 for segmenting a Wi-Fi network using group keys, according to one embodiment described herein. For clarity, the method 200 is discussed using the Wi-Fi network 100 illustrated in FIG. 1. However, the method 200 is not limited to such and can be used with Wi-Fi network with various configurations.

At block 205, the WLAN controller 130 transmits description data of a client device to the authentication server 110. As mentioned above, the description data describes the client device 145 (or a user owning the client device 145). For example, the description data may be a name of the user, a job title of the user, or other user attribute. In another example, the description data may by a type of the client device (table, laptop, mobile phone, etc.). In general, the description data can be any combination of parameters or data useful for assigning the client device 145 to a particular group.

In one embodiment, the WLAN controller 130 receives the description data from the client device 145. For example, when a client device 145 attempts to connect to an SSID 105 and AP 140, the client device 145 may transmit description data to the AP 140 as part of the authentication process which the AP 140 then forwards to the WLAN controller 130 or authentication server. In another embodiment, the WLAN controller 130 or the AP 140 generates the description data rather than receiving it from the client device 145. For example, based on the type of traffic or data transmitted by the client device 145, the WLAN controller 130 can deduce a type of the client device (e.g., whether it is a laptop or a mobile phone). As such, the description data can either be provided by the client device 145 or derived by the AP 140 and/or WLAN controller 130.

At block 210, the group assignor 115 in the authentication server 110 assigns the client device 145 to a group using the description data. For example, the group assignor 115 may include a set of rules or criteria for evaluating the description data and then deciding what group tag 120 should be assigned to the client device 145. For example, the group assignor 115 may use the user name to assign every client device 145 owned by John Doe to the same group tag 120. In another example, each client device 145 used by a particular type of employee (e.g., the employees in the human resource department) is assigned to the same group tag 120. In another example, the client device 145 may include description data that would qualify it for multiple groups. The group assignor 115 may select only one group (i.e., using a best match approach) or, as discussed in later embodiments, may assign multiple group tags 120 to the same client device 145 (e.g., different group tags for different data flows originating at the client device 145).

At block 215, the group assignor 115 transmits the group tag 120 for the assigned group to the WLAN controller 130. At block 220, the WLAN controller 130 generates a group key corresponding to the group tag 120. That is, the method 200 assumes that the particular group key has not already been generated, and thus, the group key generator 135 in the WLAN controller 130 can use the group tag to generate a unique group key 155. However, in another embodiment, when receiving a group tag 120, the WLAN controller 130 may first determine whether the group key generator 135 has already generated a group key for that tag, and if so, the WLAN controller 130 retrieves the group key from storage (e.g., a database).

At block 225, the WLAN controller 130 transmits the group tag 120 and the group key 155 to the client device 145 via the AP 140. For example, the method 200 may be performed in response to a client device 145 first connecting to the AP 140. In one embodiment, the AP 140 transmits the group tag 120 and the group key 155 to the client device 145 after the authentication server 110 has given permission for the client device 145 to join the SSID 105 hosted by the AP 140. Moreover, the AP 140 may transmit the group tag 120 and the group key 155 to the client device 145 after secure unicast transmission has been established using a unicast encryption key.

At block 230, the client device 145 encrypts multicast traffic using the group key 155. As such, only other client device 145 in the same group (which can be connected to the same SSID or AP, or to a different SSID on the same AP radio) can decrypt the multicast traffic. Other client devices 145 which may be connected to the same SSID or AP, or different SSIDs and APs, which are assigned to different groups and have different group keys may receive the multicast traffic but cannot decrypt the multicast traffic. As such, the client devices 145 in other groups ignore the multicast traffic.

Figure 3:
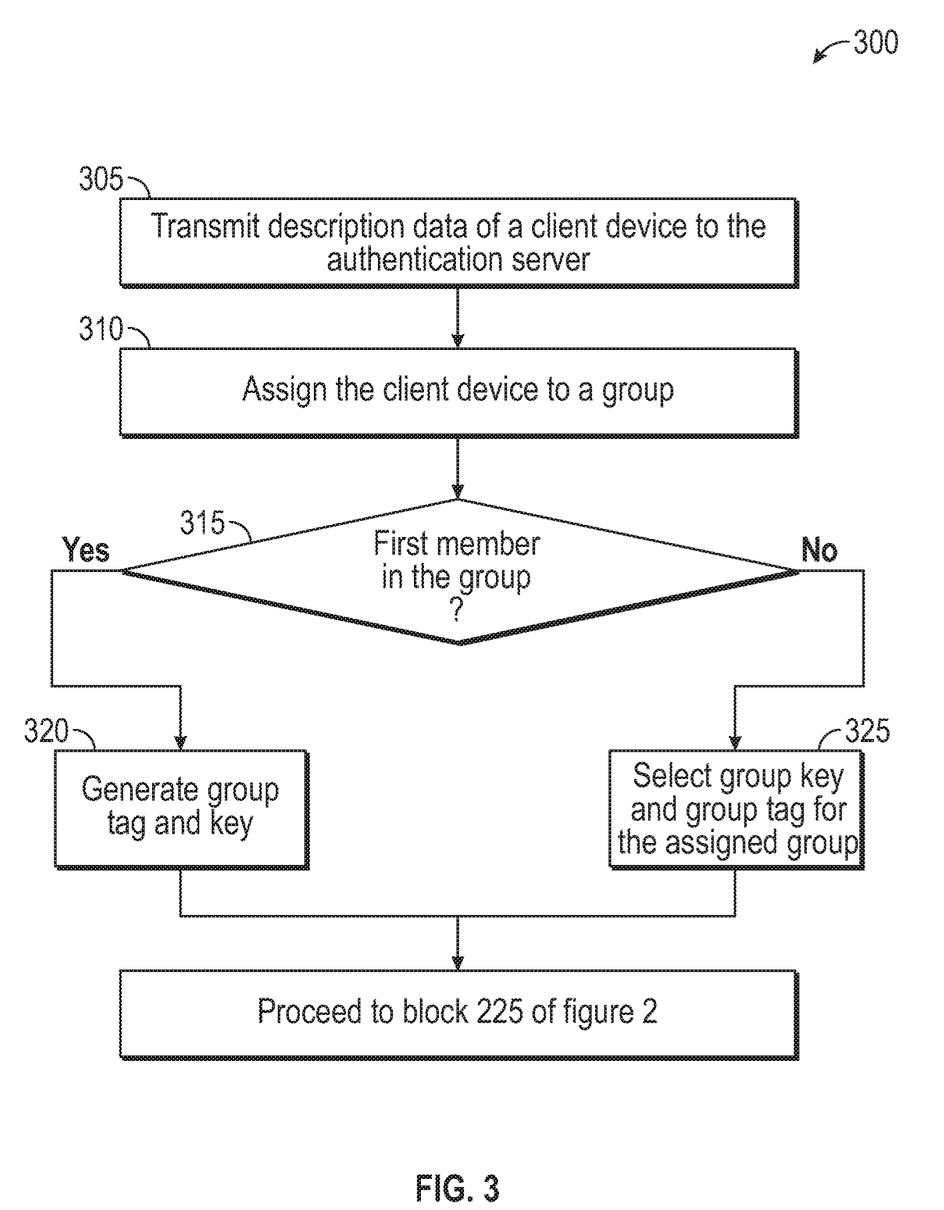
FIG. 3 is a flowchart for segmenting a Wi-Fi network using group keys, according to one embodiment described herein.

FIG. 3 is a flowchart of a method 300 for segmenting a Wi-Fi network using group keys, according to one embodiment described herein. Like the method 200, for clarity, the method 300 is discussed using the Wi-Fi network 100 illustrated in FIG. 1. However, the method 300 is not limited to such and can be used with Wi-Fi network with other configurations. Unlike in method 200 where the WLAN controller 130 generates the group key, in method 300, the authentication server hosts the group key generator 135.

At block 305, the WLAN controller 130 transmits description data of a client device to the authentication server 110. As mentioned above, the description data describes the client device 145 (or a user owning the client device 145). For example, the description data may be a name of the user, a job title of the user, or other user attribute. In another example, the description data may by a type of the client device (table, laptop, mobile phone, etc.). In general, the description data can be any data useful for assigning the client device 145 to a particular group.

At block 310, the group assignor 115 assigns the client device 145 to a particular group. As discussed above, the group assignor 115 can use one or more rules or criteria to evaluate the description data to determine the best group for the client device. Further, in some embodiments, different applications or traffic flows in the client device may be assigned to different groups.

At block 315, the group assignor 115 determines whether the client device is the first member in the group. For example, when establishing the groups (and the criteria for gaining membership into a group), the system administrator may not have generated a group key for that group. Thus, if the client device is the first assigned member of the group, the method 300 proceeds to block 320 where the authentication server 110 generates the group key for the group. In other words, rather than the WLAN controller 130 receiving a group tag from the authentication server 110 and generating the group key, in the method 300 the group key generator 135 may be hosted by the authentication server 110 so that the server 110 both selects the group tag 120 (e.g., assigns the client to a particular group) and generates a group key for each group tag 120 when the first client device is assigned to that group.

However, if the client device is not the first member of the group, the method 300 proceeds to block 325 where the authentication server 110 selects the group key 155 and the group tag 120 for the assigned group. That is, the group key generator 135 has already generated the group key 155, in which case the key 155 can be retrieved from memory. The method 300 then proceeds to block 225 of FIG. 2 where the group tag 120 and group key 155 are delivered to the client device using, e.g., the WLAN controller 130 and the AP 140.

Because in the method 300 the authentication server 110 may generate the group keys (rather than the AP), the authentication protocol (e.g., an Extensible Authentication Protocol) used for authentication may be modified to allow for the transport of a group key, on top of the existing transport of a unicast key. One advantage of permitting the authentication server 110 to generate the group keys is when roaming, the client can keep its group keys. This is especially useful in the case of fast roaming, where generating multiple new group keys on the new AP would take time. With method 300, the group keys are passed between APs.

Further, in most cases where a user sends traffic to another user, the user sends encrypted traffic to the AP, the AP decrypts, finds where the target user is, then sends the data (encrypting the data if sent over the wireless link, and not encrypted the data if sent over wire). The next AP encrypts the data if the destination is in that next AP cell. As such, a common key across APs may be useful for cross-AP traffic, but it is especially useful to allow users to send P2P traffic within the group.

In addition, usually group keys are changed when the group membership changes (a new user joins the group, a user leaves the group). With method 300, this means that the AP has to inform the authentication server every time this happens, so the server generates the new key. As such, the method 300 may not scale as well as the method 200.

Figure 4:
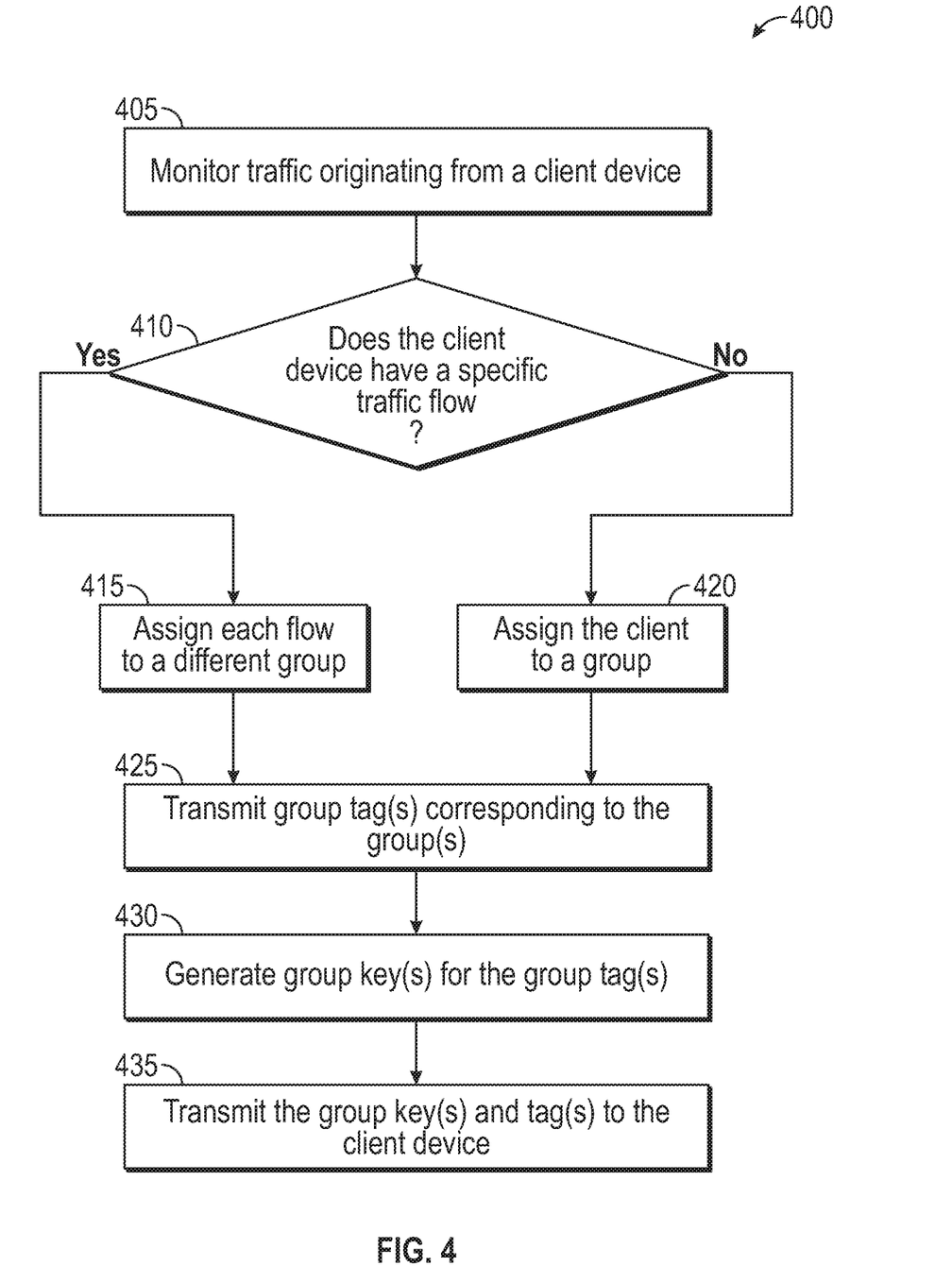
FIG. 4 is a flowchart for assigning multiple group keys to the same client device, according to one embodiment described herein.
Figure 5:
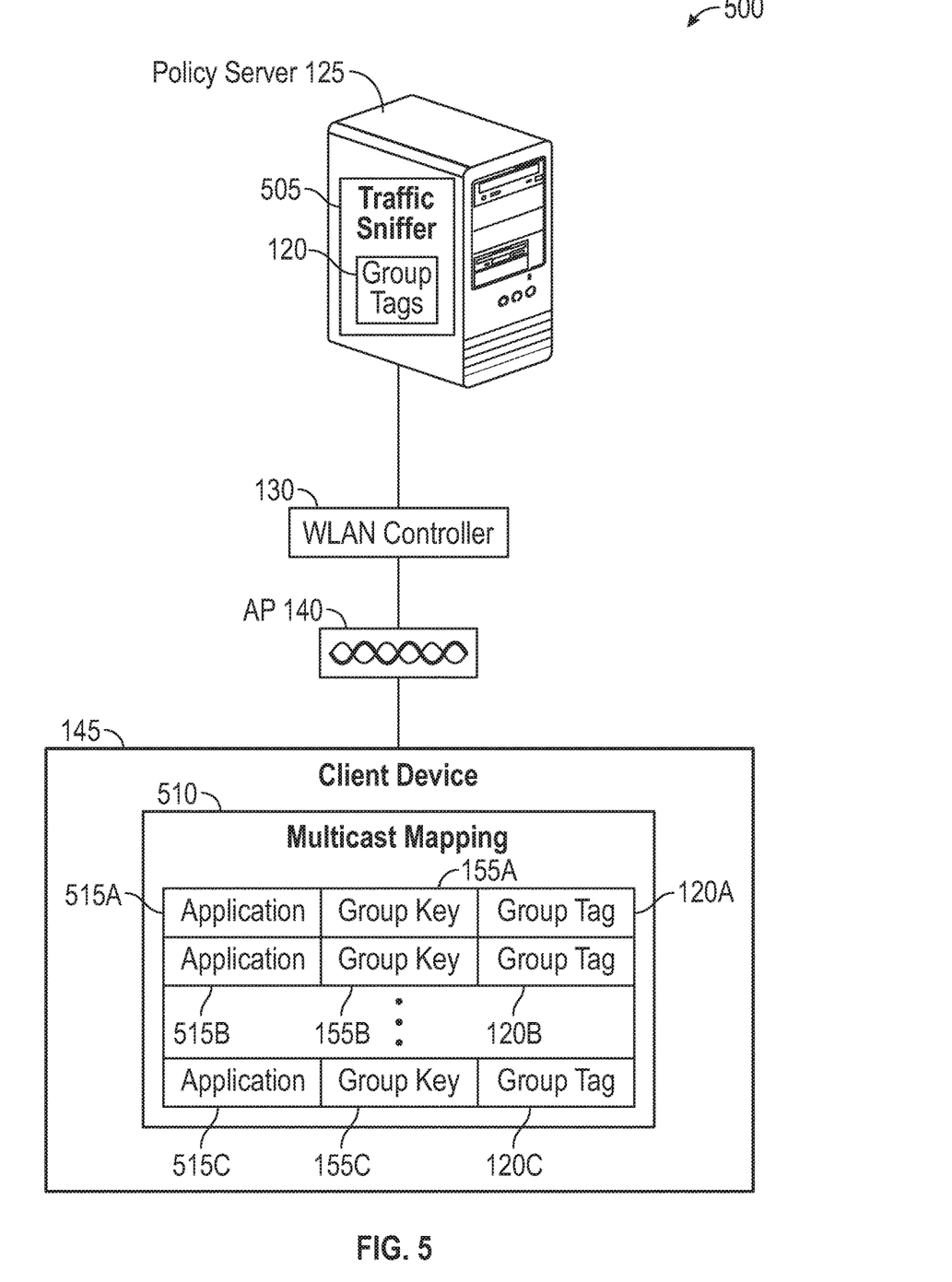
FIG. 5 illustrates assigning group keys to different data flows in a client device, according to one embodiment described herein.

FIG. 4 is a flowchart of a method 400 for assigning multiple group keys to the same client device, according to one embodiment described herein. For clarity, the method 400 is discussed in tandem with FIG. 5 which illustrates assigning group keys to different data flows or traffic characteristics (e.g., user datagram protocol (UDP) or Differentiated Services Code Point (DSCP) 46) in a client device, according to one embodiment described herein. Specifically, FIG. 5 illustrates a Wi-Fi network 500 that includes the policy server 125 for assigning the group tags 120 to different applications 515 executing in the client device 145. That is, using the method 400, the Wi-Fi network 500 can assign multiple group tags 120 to the same client device 145.

At block 405, a traffic sniffer 505 monitors traffic originating from a client device. In one embodiment, the policy server 125 may not be inline with the client device. Instead, the policy server 125 may receive metadata information about each client device's traffic. The policy server 125 may also have been programmed to assign tags to particular groups, and those tags may have been pushed to the WLAN controller 130, through which traffic flows. In that case, the WLAN controller 130 may identify the traffic and apply the tag.

In another embodiment, the policy server 125 is inline with the data traffic flowing to or from the client device 145. As the traffic passes through the policy server 125, the traffic sniffer 505 can identify different types of traffic flows corresponding to the client device. For example, the traffic sniffer 505 can detect voice over IP (VoIP) traffic, audio data from a streaming music service, or gaming traffic associated with playing online video games. Put differently, the traffic sniffer 505 can identify different traffic flows that may be generated by different applications 515 executing on the client device 145. The traffic flows (and their corresponding attributes) can also be used as description data for assigning a group or groups to a client device 145.

At block 410, the traffic sniffer 505 determines whether the client device 145 has a specific traffic flow. Put differently, the traffic sniffer 505 determines whether there is at least one identifiable traffic flow in the traffic flowing to or from the client device. For example, the traffic sniffer 505 may continually monitor the traffic flow to determine whether a client device has different traffic flows associated therewith. In one embodiment, unlike methods 200 and 300 which can occur when a client device first attempts to associate to an AP or SSID (e.g., as part of the association process), the method 400 may be performed when the client device first associates with an AP or after the client device has associated with the AP and has begun to communicate with other networks or devices. In one embodiment, the traffic sniffer 505 may identify the different traffic flows at different times. For example, at Time A, the traffic sniffer 505 may identify an audio/visual traffic flow associated with a streaming application on the client device, and then later, at Time B, identify a VoIP traffic flow.

If the traffic sniffer 505 identifies a specific traffic flow (e.g., an audio/visual data as part of a streaming application), the method 400 proceeds to block 415 where the traffic sniffer 505 assigns each of the identifiable traffic flows to a different group. For example, if the client device has only one identifiable traffic flow, the traffic sniffer 505 may assign that traffic to a different group than all the remaining traffic generated by the client device 145. If the client device 145 has multiple traffic flows, then each flow is assigned to a different group while the remaining traffic may be assigned to a catch-all group for the client device 145.

Similarly, traffic may be characterized at block 505, and policies can be designed to assign a type of traffic to a particular label or group, for example all VoIP traffic with the same tag, even if it is generated by different applications. In the examples above, traffic flow would not only characterize the traffic type as described (e.g. VoIP), but a traffic flow also may be characteristic of the application generating it (so Application A's audio would be different from Application B's audio), a different traffic flow and therefore a different label, because users using Application A are likely to be different from the group of users using Application B for their VoIP traffic. Then, with this note, we can also decide to group the users (e.g., the users using Application A and Application B) under the same label/group.

In one embodiment, the traffic sniffer 505 may assign the traffic flows to a predefined group based on the attributes of the traffic flow—e.g., whether the flow transmits audio/visual data, VoIP data, discovery data part of a Zeroconf standard, etc. For example, a system administrator may establish criteria for assigning a traffic flow to a predefined group based on its attributes. In another embodiment, the traffic sniffer 505 may create the groups automatically (e.g., without user input). In this example, the traffic sniffer 505 may identify a type of each traffic flow and each time a new type of traffic flow is identified, the traffic sniffer 505 creates a new group. If the traffic sniffer 505 identifies a new traffic flow on another client device that is the same type as a previously identified traffic flow, the traffic sniffer 505 assigns the new traffic flow to the same group as the previously identified traffic flow. In this manner, similar traffic flows (which may originate from the same application being executed on different client devices 145) can be assigned to the same group.

If, however, the traffic sniffer 505 is unable to identify a specific traffic flow, the method 400 proceeds to block 420 where the traffic sniffer 505 assigns the client device to a group. That is, all the traffic to and from the client device 145 may be assigned to the same group. When first associating the client device 145 to the AP, the traffic sniffer 505 may initially assign all the traffic corresponding to the client device 145 to the same group. Later, after identifying different traffic flows, the method 400 can be repeated to identify specific traffic flows and assign those flows to different groups from the other traffic flowing to or from the client device 145.

At block 425, the policy server 125 transmits the group tag or tags corresponding to the selected group or groups to the WLAN controller 130. At block 430, the WLAN controller 130 generates or selects the group keys for the groups tags 120 selected by the traffic sniffer 505. In other embodiments, instead of relying on the WLAN controller 130, the policy server 125 or another entity may generate the group keys.

At block 435, the WLAN controller 130 and the AP 140 transmit the group keys 155 and tags 120 to the client device 145. FIG. 5 illustrates a multicast mapping 510 which stores the group keys 155 and group tags 120 in the client device 145. The multicast mapping 510 can be implemented using registers, a table, a database, and the like. The first column of the mapping 510 lists applications 515 executing in the client device that are responsible for different traffic flows identified by the traffic sniffer 505. For example, the traffic sniffer 505 can inform the client device 145 which traffic flows it identified and the client device can then identify the application 515 (or applications) which are responsible for the traffic flow. In this manner, by matching the identified traffic flows to the applications 515 in the client device 145, the appropriate group keys 155 and group tags 120 can be linked to the applications 515. For example, the client device 145 can determine that application 515A generates an audio/visual traffic flow and assign the group tag 120A (and corresponding group key 155A) assigned by the traffic sniffer 505 to that traffic flow to the application 515A. The client device 145 can perform the matching process for each traffic flow identified by the traffic sniffer 505 and the applications 515 hosted on the client device.

Using the multicast mapping 510, the client device 145 can encrypt multicast traffic using the group key 155. For example, when sending out multicast traffic, the client device 145 identifies which application 515 generated the traffic and then uses the corresponding group key 155 indicated in the mapping 510 to encrypt the multicast traffic. As such, only other client devices 145 in the same group, or other client devices 145 which have applications in the same group can decrypt the multicast traffic. Other client devices 145 or applications 515 which are assigned to different groups ignore the multicast traffic.

Figure 6:
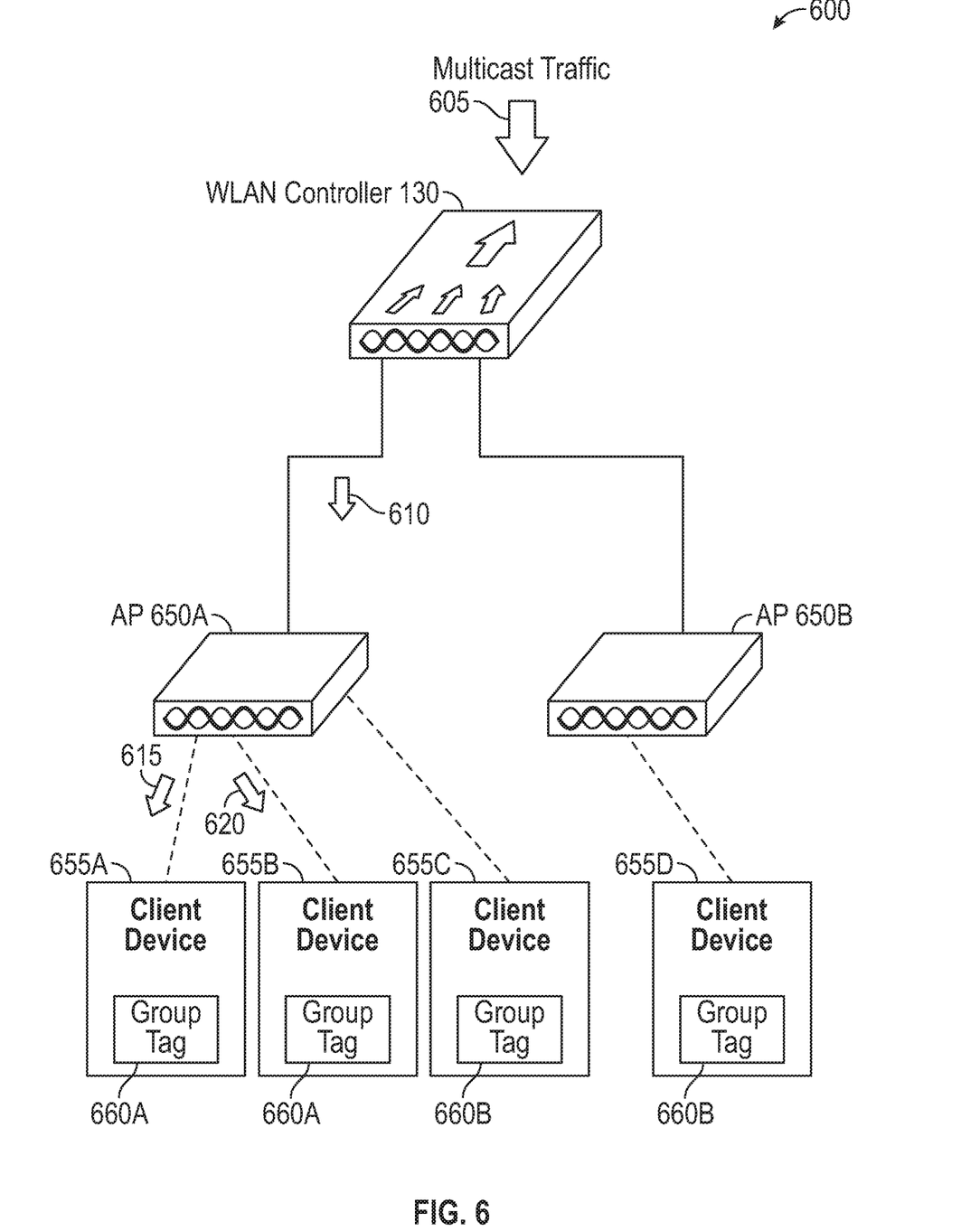
FIG. 6 illustrates using group tags to limit the transmission of multicast data in a wired backend, according to one embodiment described herein.

FIG. 6 illustrates using group tags to limit the transmission of multicast data in a wired backend, according to one embodiment described herein. In this example, FIG. 6 is a Wi-Fi network 600 that includes a WLAN controller 130 which receives multicast traffic for a particular group as illustrated by arrow 605. Without the micro-segmentation embodiments discussed herein, the WLAN controller 130 may transmit the multicast traffic to all the APs that may broadcast the same SSID, especially if the multicast group is generic enough that multiple clients may be default target candidates (e.g. mDNS groups). That is, assuming the AP 650A and 650B broadcast the same SSID, the WLAN controller 130 would forward the multicast traffic to both APs 650 since all the client device 655 connected to the same SSID are assigned to the same group.

However, using the micro-segmentation techniques above to assign client devices and/or applications and traffic flows to different groups, not all of the client devices connected to the same SSID are in the same group. In FIG. 6, the client devices 655A and 655B are in the same group represented by the group tag 660A while the client devices 655C and 655D are in a different group as represented by the group tag 660B.

The WLAN controller 130 can maintain a record of the client devices 145 and their assigned groups. Put differently, the WLAN controller 130 knows that the client devices 145 coupled to the AP 650A are assigned both the group tags 660A and 660B while the client devices 145 coupled to the AP 650B are assigned only to the group tag 660B. In FIG. 6, it is assumed the multicast traffic is intended only for devices 145 assigned the group tag 660A. As such, the WLAN controller 130 can intelligently forward the multicast traffic to the AP 650A using a wired interface but not forward the traffic to the AP 6506.

The AP 650B then broadcast the multicast traffic to all its associated client devices 655 but the multicast traffic can be decrypted only by the client devices 655 that have the appropriate group key—i.e., the client devices 655A and 655A. Put differently, the client device 655C may receive the wirelessly transmitted multicast traffic but cannot decrypt the data (or determines it for another group), and ignores it. Thus, by micro-segmenting the client devices 655 in the Wi-Fi network 600 into different groups, the WLAN controller 130 can reduce the amount of multicast traffic that flows through the wired back-end relative to a Wi-Fi network where all the client devices using the same SSID are assigned to the same group.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
  receiving electronic communications relating to first and second client devices;
  identifying description data corresponding to the first client device and the second client device based on the electronic communications;
  assigning the first client device to a first multicast group and the second client device to a second multicast group based on the description data; and
  transmitting a first group key corresponding to the first multicast group to the first client device and a second group key corresponding to the second multicast group to the second client device,
  wherein the first and second group keys permit the first and second client devices to transmit encrypted multicast traffic to the first and second multicast groups, respectively, when the first and second client devices are wirelessly connected to a same service set identifier (SSID).

2. The method of claim 1, wherein the first and second client devices are associated to a same access point (AP).

3. The method of claim 1, further comprising:
  assigning a third client device to the first multicast group based on description data associated with the third client device; and
  transmitting the first group key corresponding to the first multicast group to the third client device,
  wherein the first group key permits the first and third client devices to transmit multicast traffic directly to each other when the first client device is connected to a first SSID and the third client device is connected to a second, different SSID.

4. The method of claim 3, wherein the first and third client devices are associated to different APs when connected to the first and second SSIDs.

5. The method of claim 1, further comprising:
  receiving requests from the first and second client devices to connect to the same SSID, wherein assigning the first client device to the first multicast group and the second client device to the second multicast group is performed in response to the requests from the first and second client devices.

6. The method of claim 5, wherein transmitting the first group key to the first client device and the second group key to the second client device is performed after establishing secure unicast communication with the first client device and the second client device.

7. The method of claim 1, further comprising:
  assigning a first predefined group tag corresponding to the first multicast group to the first client device and a second predefined group tag corresponding to the second multicast group to the second client device; and
  transmitting the first predefined group tag to the first client device and the second predefined group tag to the second client device.

8. The method of claim 7, further comprising:
  evaluating the description data using a plurality of predefined rules to determine to assign the first predefined group tag to the first client device and the second predefined group tag to the second client device.

9. The method of claim 1, further comprising:
  monitoring traffic originating from the first client device;
  determining that the first client device corresponds to a first type of traffic flow and a second type of traffic flow;
  assigning the first type of traffic flow to the first multicast group and the second type of traffic flow to a third multicast group; and
  transmitting, along with the first group key, a third group key corresponding to the third multicast group to the first client device,
  wherein the first group key permits the first client device to encrypt multicast traffic for the first type of traffic flow and the third group key permits the first client device to encrypt multicast traffic for the second type of traffic flow.

10. The method of claim 9, wherein the first type of traffic flow corresponds to a first software application executing in the client device and the second type of traffic flow corresponds to a second software application executing in the client device.

11. A system comprising:
  a first AP supporting a first SSID;
  a controller coupled to the first AP; and
  a first computing system comprising a first processor configured to execute a group assignor, wherein the group assignor is configured to:
    identify description data corresponding to first and second client devices, and
    assign the first client device to a first multicast group and the second client device to a second multicast group based on the description data,
  wherein the first AP is configured to wirelessly transmit a first group key corresponding to the first multicast group to the first client device and a second group key corresponding to the second multicast group to the second client device,
  wherein the first and second group keys permit the first and second client devices to transmit encrypted multicast traffic to the first and second multicast groups, respectively, when the first and second client devices are wirelessly connected to the first SSID.

12. The system of claim 11, further comprising:
  a second AP supporting a second SSID different from the first SSID,
  wherein the group assignor is configured to assign a third client device to the first multicast group based on description data associated with the third client device;
  wherein the second AP is configured to transmit the first group key corresponding to the first multicast group to the third client device, and
  wherein the first group key permits the first and third client devices to transmit multicast traffic directly to each other when the first client device is connected to the first SSID and the third client device is connected to the second SSID.

13. The system of claim 11, wherein the first AP is configured to receive requests from the first and second client devices to connect to the first SSID, wherein assigning the first client device to the first multicast group and the second client device to the second multicast group is performed in response to the requests from the first and second client devices.

14. The system of claim 13, wherein transmitting the first group key to the first client device and the second group key to the second client device is performed after establishing secure unicast communication between the first client device, the second client device, and the first AP.

15. The system of claim 11, further comprising:
a second computing system comprising a second processor configured to execute a traffic sniffer configured to:
monitor traffic originating from the first client device; and
determine that the first client device corresponds to a first type of traffic flow and a second type of traffic flow,
wherein assigning the first client device to the first multicast group comprises assigning the first type of traffic flow to the first multicast group and the second type of traffic flow to a third multicast group,
wherein the first AP is configured to transmit, along with the first group key, a third group key corresponding to the third multicast group to the first client device,
wherein the first group key permits the first client device to encrypt multicast traffic for the first type of traffic flow and the third group key permits the first client device to encrypt multicast traffic for the second type of traffic flow.

16. A non-transitory computer-readable medium having program instructions embodied therewith, the program instructions executable by a processor to perform an operation, the operation comprising:
identifying description data corresponding to first and second client devices;
monitoring traffic originating from the first client device;
determining that the first client device corresponds to a first type of traffic flow and a second type of traffic flow;
assigning the first client device to a first multicast group and the second client device to a second multicast group based on the description data;
assigning the first type of traffic flow to the first multicast group and the second type of traffic flow to a third multicast group;
transmitting a first group key corresponding to the first multicast group to the first client device and a second group key corresponding to the second multicast group to the second client device,
wherein the first and second group key permit the first and second client devices to transmit encrypted multicast traffic to the first and second multicast groups, respectively, when the first and second client devices are wirelessly connected to a same SSID; and
transmitting, along with the first group key, a third group key corresponding to the third multicast group to the first client device,
wherein the first group key permits the first client device to encrypt multicast traffic for the first type of traffic flow and the third group key permits the fist client device to encrypt multicast traffic for the second type of traffic flow.

17. The non-transitory computer-readable medium of claim 16, the operation further comprising:
assigning a third client device to the first multicast group based on description data associated with the third client device; and
transmitting the first group key corresponding to the first multicast group to the third client device,
wherein the first group key permits the first and third client devices to transmit multicast traffic directly to each other when the first client device is connected to a first SSID and the third client device is connected to a second, different SSID.

18. The non-transitory computer-readable medium of claim 16, the operation further comprising:
receiving requests from the first and second client devices to connect to the same SSID, wherein assigning the first client device to the first multicast group and the second client device to the second multicast group is performed in response to the requests from the first and second client devices.

19. The non-transitory computer-readable medium of claim 16, wherein the first type of traffic flow corresponds to a first software application executing in the client device and the second type of traffic flow corresponds to a second software application executing in the client device.

* * * * *

UNITED STATES PATENT AND TRADEMARK OFFICE
CERTIFICATE OF CORRECTION

PATENT NO.         : 10,944,734 B2
APPLICATION NO.    : 16/104537
DATED              : March 9, 2021
INVENTOR(S)        : Stephen M. Orr et al.

Page 1 of 1

It is certified that error appears in the above-identified patent and that said Letters Patent is hereby corrected as shown below:

In the Specification

In Column 2, Line 11, delete "(SSID)" and insert -- (SSID). --, therefor.

In Column 6, Line 2, delete "by" and insert -- be --, therefor.

In Column 7, Line 24, delete "by" and insert -- be --, therefor.

In the Claims

In Column 16, Line 17, in Claim 16, delete "fist" and insert -- first --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*